United States Patent [19]
Grohoski et al.

[11] Patent Number: 5,555,543
[45] Date of Patent: Sep. 10, 1996

[54] CROSSBAR SWITCH APPARATUS AND PROTOCOL

[75] Inventors: Gregory F. Grohoski, Cedar Park; Oscar R. Mitchell, Pflugerville, both of Tex.; Tung M. Nguyen, Menlo Park, Calif.; Yongjae Rim, Cedar Park, Tex.

[73] Assignee: International Business Machines Corporation, Armonk, N.Y.

[21] Appl. No.: 367,645

[22] Filed: Jan. 3, 1995

[51] Int. Cl.$^6$ .............................. H04J 3/24; H04Q 11/00
[52] U.S. Cl. ........................ 370/58.1; 370/60; 340/826; 395/200.05
[58] Field of Search ............................ 370/13, 14, 58.1, 370/58.2, 58.3, 60, 60.1, 65.5, 68.1, 94.3, 110.1, 92; 340/826, 825.79; 395/200.05

[56] References Cited

U.S. PATENT DOCUMENTS

| | | |
|---|---|---|
| 4,516,238 | 5/1985 | Huang et al. . |
| 4,556,939 | 12/1985 | Read . |
| 4,630,045 | 12/1986 | Georgiou . |
| 4,809,217 | 2/1989 | Floro et al. . |
| 4,821,034 | 4/1989 | Anderson et al. . |
| 4,935,894 | 6/1990 | Ternes et al. . |
| 4,947,478 | 8/1990 | Maeno . |
| 5,109,490 | 4/1992 | Arimilli et al. . |
| 5,150,357 | 9/1992 | Hopner et al. . |
| 5,175,824 | 12/1992 | Soderbery et al. . |
| 5,179,669 | 1/1993 | Peters . |
| 5,414,704 | 5/1995 | Spinney ...................... 370/60 |
| 5,422,879 | 6/1995 | Parsons et al. ............... 370/60 |
| 5,423,006 | 6/1995 | Brown et al. ............... 370/60 X |

OTHER PUBLICATIONS

W. E. Denzel, et al., "A Highly Modular Packet Switch for Gb/s Rates". IBM Research Division, Switzerland, Nov. 22, 1991, pp. 1–25.

M. I. Lilie, et al., "Crosspoint Switch for ATS", IBM Technical Disclosure Bulletin, vol. 20, No. 2, Jul. 1977, pp. 816–817.

John Keller, "High–Tech Play: AT&T Seeks a Big Role in Multimedia Future", The Wall Street Journal, Thursday, Apr. 22, 1993, pp. A1, A10.

Primary Examiner—Melvin Marcelo
Attorney, Agent, or Firm—Anthony V. S. England; Keith L. Hargrove; Andrew J. Dillon

[57] ABSTRACT

A computer networking system includes a cross bar switch and a protocol for operating the same. The crossbar switch typically connects a plurality of ports one to another and the protocol establishes a connection between a first desired port and a second desired port selected from the plurality of ports. Each port further connects to a compute element via a master bidirectional bus and a slave bidirectional bus. Any of the compute elements can serve as either a master or slave to any other compute element connected to the crossbar switch. A master port connects the bidirectional bus to the crossbar switch and a slave port connects the slave bidirectional bus to the crossbar switch. The master port is reserved for compute element initiated operations while the slave port is reserved for network initiated operations. The crossbar switch receives and transmits control, address, and data information over a CPU bus to a network router unit, which is used as the interface between the CPU and the crossbar switch to translate CPU bus protocol to switch protocol. The crossbar switch uses an in band switch design, which excludes explicit control pins to control the switch and relies on control being transmitted over wires shared between the data and the address functions. The switch and protocol support load, store, broadcast, compare, and swap and barrier synchronization primitives, using no control pins and minimizing overhead.

6 Claims, 4 Drawing Sheets

CROSSBAR SWITCH APPARATUS AND PROTOCOL

BACKGROUND OF THE INVENTION

1. Technical Field

The present invention relates in general to digital computer systems and more particularly to a digital computer system that allows individual elements or processors to perform high-speed, low latency communications with each other in a parallel fashion over switching networks.

2. Description of the Related Art

Multistage switching networks are well known in the art and are used for interconnecting multiple devices within a digital data computer processing system. In particular, a typical networking system may use a multistaged switching network to interconnect n system elements, where n can be any number of processors or combinations of processors and other system elements.

Current state of the art switching systems have several problems, which include: expense, slow operation speed, lack of expandability, difficulty in reconfiguring, serial in nature, and clock synchronization. Thus, it is important to seek out characteristics in the medium that include fast access arbitration, fair arbitration (i.e., no unit is starved for access), independence of connections, deadlock prevention, equal opportunity for a processor to send and to receive and modular growth capability.

Further, it is preferred to use a nonblocking medium, one that allows any interconnection that the processors are capable of handling to be made at any time. Such a medium is most versatile and efficient in that, it does not limit the number of interconnections between processors that may be made. It therefore delays the establishment of interprocessor connections the least of any interconnection arrangement. Also, because it allows a plurality of independent connections to exist at a time, such a medium achieves higher communication band with other media. Furthermore, nonblocking media, such as, for example, a crossbar switch, permit direct connection between a source and destination, and therefore, do not suffer from the latency of message or packet passing arrangements typically found in non-crossbar network systems.

Another problem facing bidirectional switching through crossbar switches, is the need for many communication ports within the crossbar system. For example, with a 40-port switch design requiring control wires, at least six wires are required per master port to identify the slave port to which a connection is desired. This implies that 240 bits per switch chip are necessary, which detracts heavily from the wires available for data transmission. In practice, this leads to a system that supports far fewer ports than otherwise is optimal. Another area that is desired to optimize is that of latency. Many switch designs sacrifice latency for connectivity. That is, as more ports are required, there is a large latency or lower band width to connect the systems. This reduces productivity and throughput, as well as slows the overall system operation speed.

Accordingly, what is needed is a crossbar switch that reduces the number of communication wires necessary for intercommunication, as well as maintaining a high degree of connectivity with a minimum overhead. Additionally, what is needed is a networking system that has a very low latency in comparison to prior solutions based upon the interconnection logic between two ports communication one with another. What is further needed is an improved approach at providing on-chip synchronization and broadcasting to minimize overhead.

SUMMARY OF THE INVENTION

It is therefore one object of the present invention to provide digital computer systems.

It is another object of the present invention to provide a digital computer system that allows individual elements or processors to perform high-speed, low latency communications with each other in a parallel fashion over switching networks.

The foregoing objects are achieved as is now described. According to the present invention, a computer networking system is disclosed that includes a cross bar switch and a protocol for operating the same. The crossbar switch typically connects a plurality of ports one to another and the protocol establishes a connection between a first desired port and a second desired port selected from the plurality of ports. Each port further connects to a compute element via a master bidirectional bus and a slave bidirectional bus. Any of the compute elements can serve as either a master or slave to any other compute element connected to the crossbar switch. A master port connects the bidirectional bus to the crossbar switch and a slave port connects the slave bidirectional bus to the crossbar switch. The master port is reserved for compute element initiated operations while the slave port is reserved for network initiated operations. The crossbar switch receives and transmits control, address, and data information over a CPU bus to a network router unit, which is used as the interface between the CPU and the crossbar switch to translate CPU bus protocol to switch protocol. The crossbar switch uses an in-band switch design, which excludes explicit control pins to control the switch and relies on control being transmitted over wires shared between the data and the address functions.

The switch and protocol support load, store, broadcast, compare, and swap and barrier synchronization primitives, using no control pins and minimizing overhead. The connection of a first port to a second port is achieved by first requesting an ID from the second port by the first port. Next, the second port transmits the ID to the first port. Once the first port receives the ID, it then requests connection with the second port. Next, the system tests to determine if the connection has been granted by the second port and then sends a command packet to the second port once connection has been granted. Then, the first port determines whether the second port has received a command packet and then allows the second port to execute the command packet and return the results back to the first port.

The protocol involves providing a token broadcast by the first port to the desired port amongst the plurality of ports. Once the token has been received, the first port receives an acknowledgement and then proceeds to perform a system wake-up. Then, the first port transmits a port number and operation type to the second port, which is then decoded by the second port. Next, the second port requests a connection with the first port and a token transmission is then provided between the two ports. Afterwards, the first port is initialized in response to broadcasts from the second port and then transactions of command packet information is completed between the two ports.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
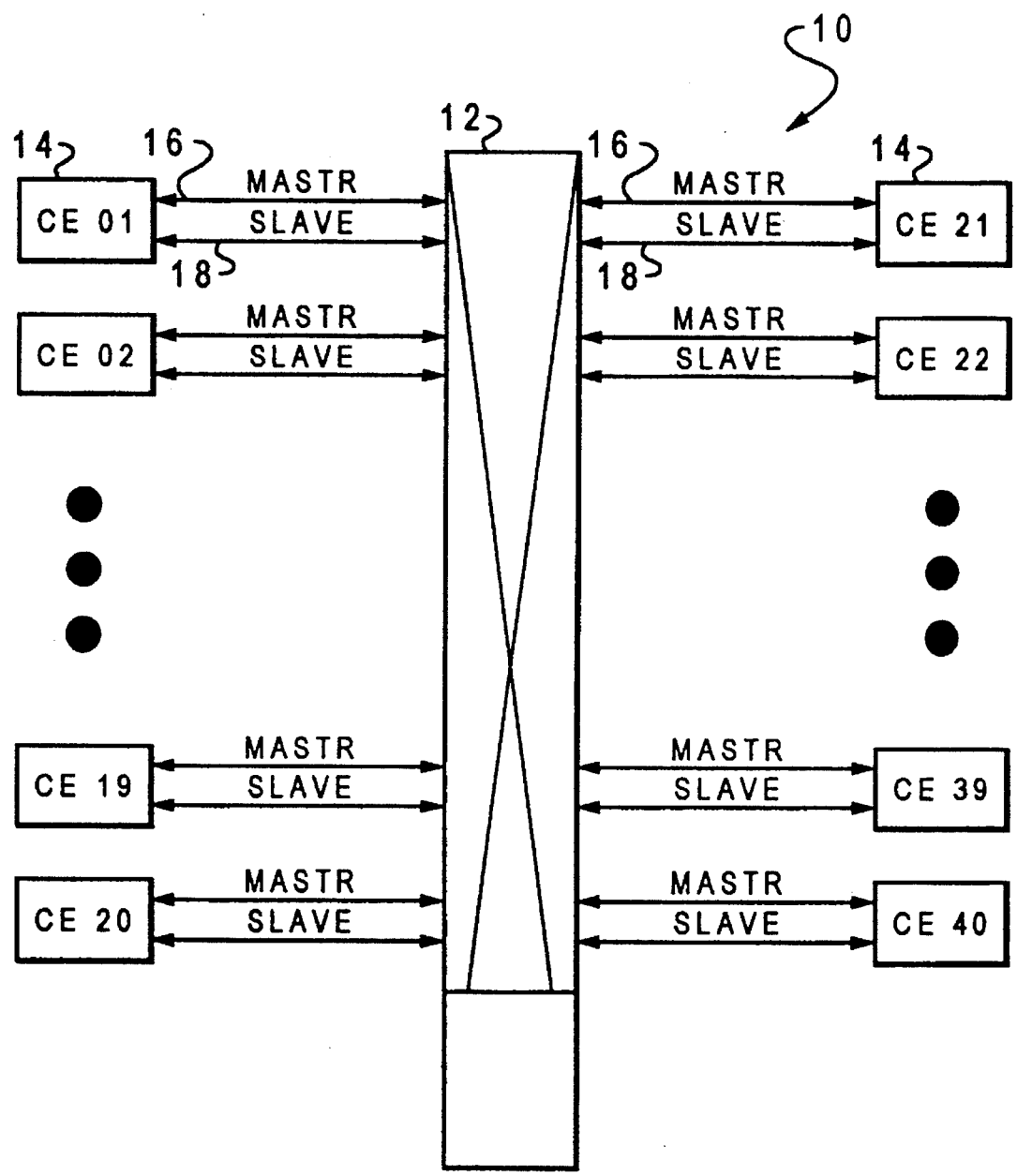
FIG. 1 depicts a block diagram of a crossbar switch system in accordance with a preferred embodiment of the present invention.

FIG. 1 depicts a block diagram of a crossbar switch system 10, which comprises a crossbar switch 12 coupled to a plurality of compute elements 14. Each compute element 14 is connected to crossbar switch 12 via a master bidirectional bus 16 and a slave bidirectional bus 18. Any compute element 14 can serve as either a master or slave to any other compute element connected to crossbar switch 12. The crossbar network 10 is a 40×40 72-bit crossbar network partitioned as 12 chips. Each chip processes 6 bits to provide a 72-bit data path to support a 64-bit data transfer, which includes a 64-bit double-word and a parity check. Crossbar switch 12 further supports 480 signal input/output lines per chip.

Crossbar switch 12 is further comprised of a plurality of master bidirectional network ports and a plurality of slave bidirectional network ports, to which master bus 16 and slave bus 18 are attached. The master port is reserved for compute element initiated operations, while the slave port is reserved for network initiated operations. Each compute element can initiate a network operation via its master port, which connects to the other CE slave ports via crossbar switch 12, and at the same time can receive a network initiated operation via its slave port.

Figure 2:
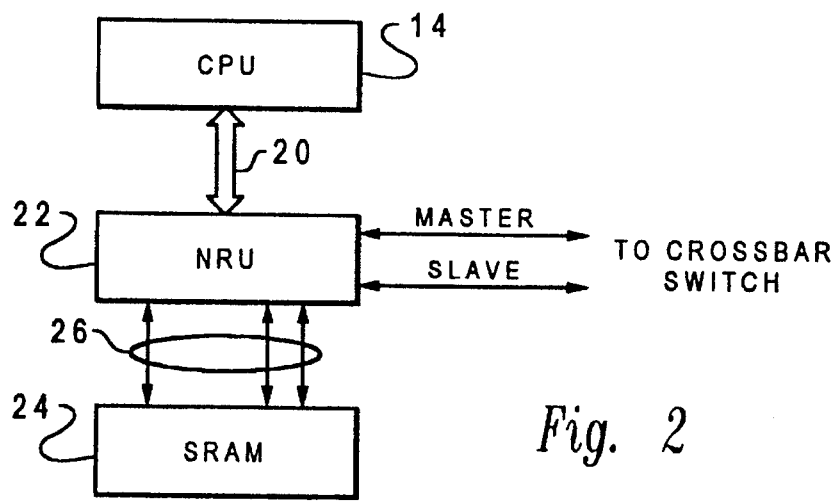
FIG. 2 is a block diagram of a typical compute element.

A typical compute element 14 is further depicted in the block diagram of FIG. 2. In this example, compute element 14 may be a central processing unit, such as a RIOS CPU as found in the RISC System/6000 manufactured by International Business Machines, Inc., but may also be any other type of CPU. CPU 14 receives and transmits control, addresses, and data information over a CPU bus 20 to a network router unit (NRU) 22, which is used as the interface between the CPU and crossbar switch 12 to translate CPU bus protocol to switch protocol. NRU 22 is further coupled to a random access memory unit 24 via a pair of 64-bit SRAM data bus and a 32-bit address bus 26.

One significant aspect of the crossbar switch as disclosed is that the design is a completely in-band switch, which uses no explicit control pins to control the switch, rather, all the control for the crossbar switch is transmitted via wires shared between data and address functions. The switch supports load, store, broadcast, compare and swap and barrier synchronization primitives, using no control pins and minimizing overhead.

Figure 3B:
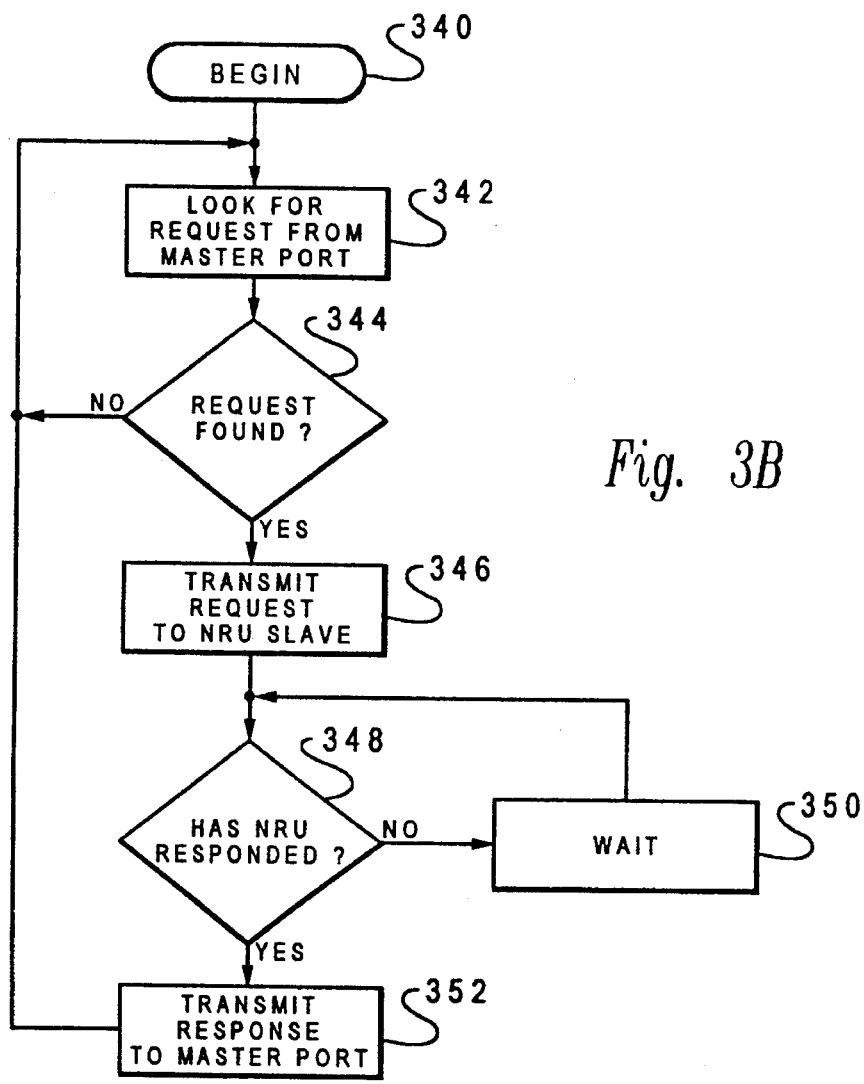
FIG. 3B is a flowchart depicting the operation of the slave port.
Figure 3A:
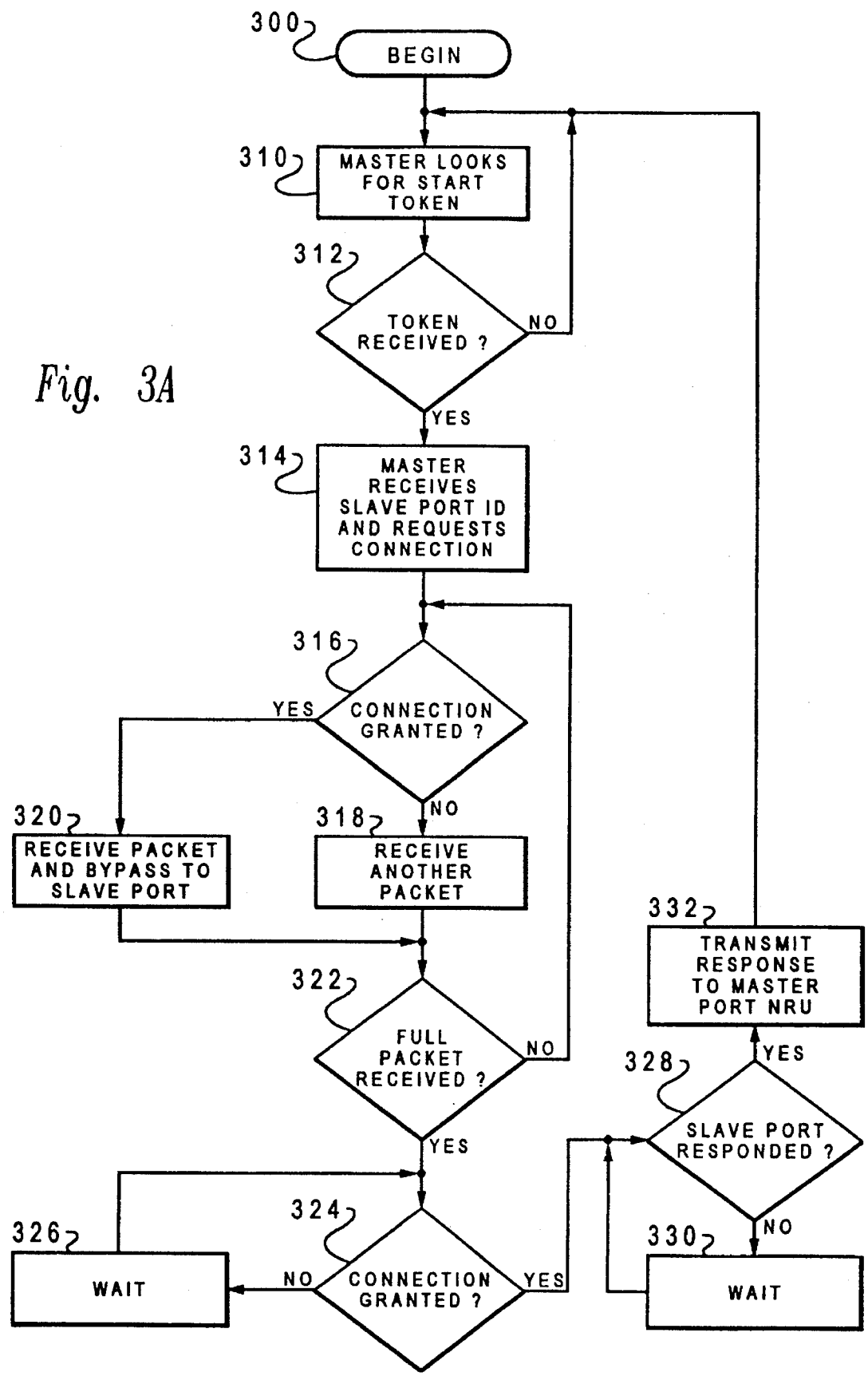
FIG. 3A is a flowchart depicting the operation of the master port.

FIG. 3 depicts two simplified flowcharts (FIGS. 3A and 3B), that describes the operation of the switch master and slave ports. FIG. 3A, through blocks 300–332, depicts the operation of the master port and FIG. 3B, through blocks 340–352, depicts operation of the slave port.

Following FIG. 3A, the master port is normally in an idle state denoted by 310–312 where it looks for a start token, which denotes the start of a new request and the type of request initiated by the NRU master port. In block 312, if a start token is not received, control returns to block 310 to continue looking for a start token. Once the start token has been received, the remainder of the command is transmitted on subsequent cycles to the master port. So, in block 314, the master receives the port ID denoting the slave port a connection will be made to, and requests a connection to that slave port. In block 316, a test is made to see if the request has been granted by the slave port. If not, in block 318, the master continues receiving the remaining command packets. If so, in block 320, the command packet is received and also bypassed to the slave port. This feature minimizes latency through the switch by routing data from the switch input (master port) to the switch output (slave port) with the absolute minimum of delay. Regardless, in block 322, a check is made to see if the entire packet has been received. If not, control returns to block 316 to again check if a connection has been granted and continue receiving and bypassing packets as appropriate. If block 322 has determined that the last packet has been received, block 324 checks if the connection has been granted yet. If not, block 326 waits, then checks again by entering block 324 at the next cycle. If so, blocks 328–330 are entered, where the master port waits for the slave to respond with the results of the command. If the slave has not responded, block 330 is entered to wait for one cycle and then the slave response is checked for the next cycle in 328. Eventually, the slave responds and block 332 is entered, where the master transmits the slave response (which might be many cycles of information) before completing the original request and returning to block 310 to wait for a new request.

Following FIG. 3B, the slave port is normally in a wait loop in block 342–344 waiting for a request from one of the master ports. If no request is found, block 344 returns to block 342 to check for a request the next cycle. Upon finding a request, block 346 is entered where the slave transmits the command packet to the NRU over the slave port. The switch slave port then enters block 348–350, where it waits for a response from the NRU Eventually, the NRU responds, and block 352 is entered, where the response is transmitted to the master port. Again, this block may be entered for many cycles, and causes the mater port to transition from block 328 to block 332. Once the NRU has delivered the complete response, the slave returns to block 342 to wait for and process a new master request.

Figure 4:
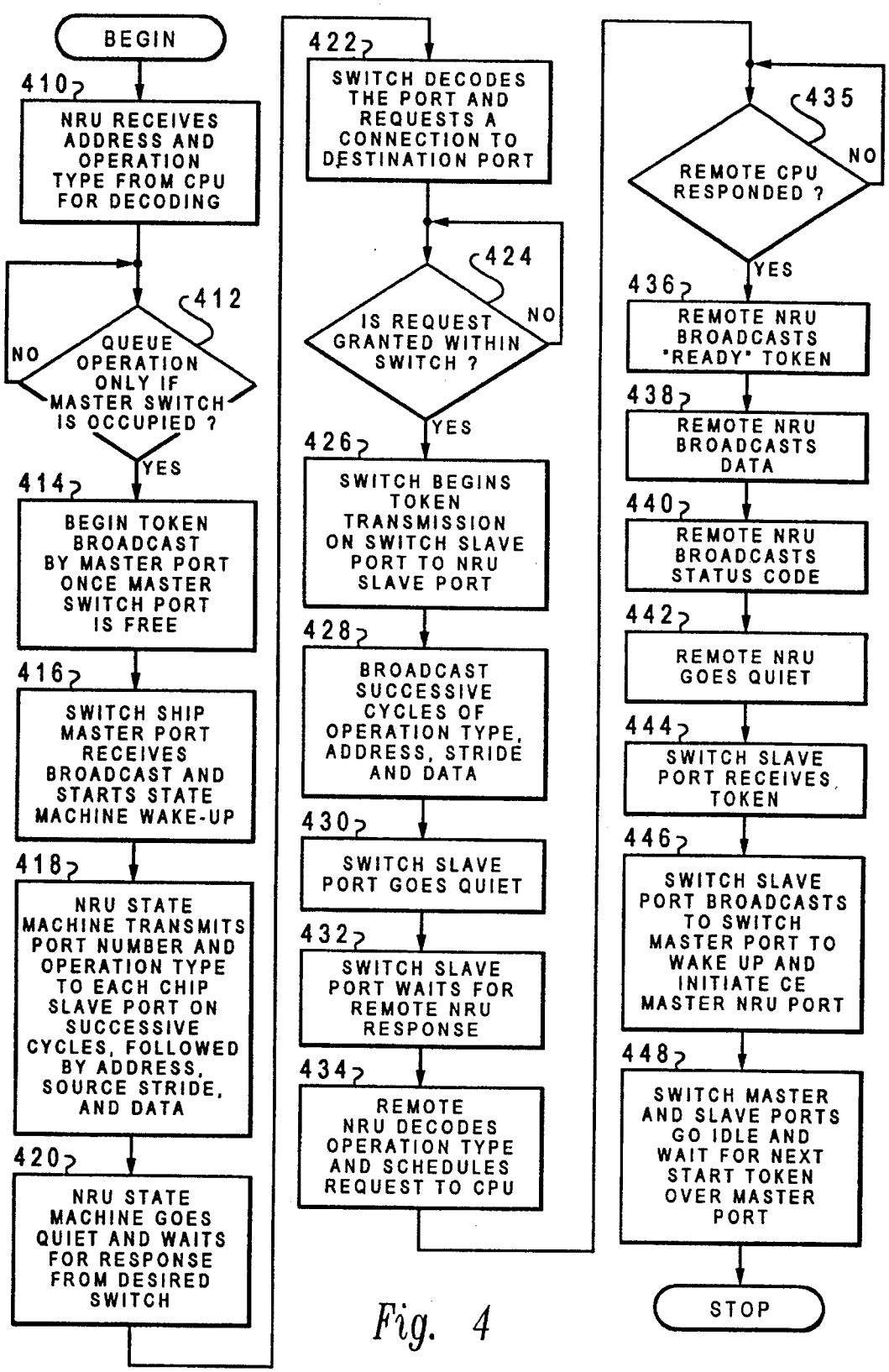
FIG. 4 is a flowchart of a sample load operation.

The protocol supports a load operation that may be either a single-word of 32 bits or a double-word of 64 bits. The master port network routing unit must know what size word is being sent, whether it is a W or DW. The load operation may support multiple loads, which acts similar in nature to a double-word copy operation that copies double-words from remote CEs to local CEs. The SRAM may run at either full speed such that data is loaded every cycle through the crossbar switch or at a half cycle, where data is loaded every other cycle through the crossbar switch, and the SRAM is two-way interleaved. The stride is set at one double-word, thus providing data during every cycle. Following the system protocol, a sample operation is depicted in the flowchart of FIG. 4, which depicts a load operation. In block 410, the NRU receives an address and operation type from the CPU for decoding. In block 412, the operation may be queued by the NRU for the master switch port, if, and only if, the master switch is currently occupied. Once the master switch port is free, in block 414, the master port begins a token broadcast over all 72 bits in 6-bit chunks simultaneously. This broadcast is received by the switch chip master port, and causes the master port to wake up in block 416, which corresponds to block 310 of FIG. 3A. The remaining description of the operation will be directed towards a single switch chip, which is sufficient to provide an overall understanding of all the switch chips due to bit slicing.

In block 418, the state machine on the NRU chip master port transmits the port number and operation type to each switch chip master port on successive cycles, followed by the address, source stride, and data. In block 420, the state machine on the NRU goes quiet and waits for a response from the master switch port. In block 422, the master switch port decodes the port ID and transmits the port connection request to the appropriate slave port. Then, in block 424, the switch waits for the request granted, which is internal to the switch. Upon receipt of request granted in block 426, the switch begins a token transmit on the switch slave port to the NRU slave port. In block 428, successive cycles of the operation type, address, stride, and data are also broadcast. In block 430, the switch slave port goes quiet and then, in block 432, waits for the remote NRU response.

In block 434, the remote NRU decodes the operation type, and schedules the request to the remote CPU. It waits in block 435 for a response from the CPU. In block 436, having received the response, it broadcasts a ready token to the switch slave port, and then in block 438, it broadcasts data followed by status code in block 440 before going quiet in block 442. The switch slave port receives the token in block 444 and then broadcasts to the switch master port in block 446 to wake up and initiate CE master NRU port. This port receives the data and the status. Next, in block 448, having finished the request, the switch master and slave ports go idle and wait for the next start token over the master port.

An example of the single-word load timing is shown in Table 1 below. By way of definition, the <> represents a 6-bit quantity replicated on a 6-bit basis, the brackets {} is a 72-bit quantity, the <>* as or the {}* denote a field that is ignored by the NRU/switch for a particular operation and the ! means that the driver is on while the other port is receiving.

An example of the load multiple double-word, as done as a result of the remote copy operation, or single LDW, is shown in Appendix AI. Additional examples in the Appendix are a single word store operation (Appendix AII), a multiple double word store operation (Appendix AIII), a broadcast of a double word appendix (Appendix AIV), a compare and swap operation (Appendix AV), and a barrier synchronization operation (Appendix AVI). A token list is illustrated in Appendix AVII.

The broadcast operation (Appendix IV) is based upon two parameters. First, the broadcaster must decide whether the data is a single-word or a double-word for broadcasting. Second, the broadcaster also must include the address, which is the same in each compute elements' memory, to which to broadcast. A broadcast configuration register is provided in each switch chip, which denotes which ports should participate in a broadcast. This provides for masking of those ports not to be used. Also during the broadcast, the Internal switch makes as many simultaneous connections as possible, continuing until all ports have received their data.

The switch also supports a barrier synchronization operation (Appendix AVI) which works as follows. There is a mask register internal to each switch chip which denotes which ports will participate in the synchronization operation. Each NRU master port transmits a barrier sync command to the master switch port. The master switch port recognizes the barrier sync command and initiates a request to sync control logic on the switch chip. It then waits for a response from the sync control logic, similar to the way it waits for a response from a slave port. When the sync control port has received a sync request from all master ports identified by the sync mask, it generates a response to the master ports. The master ports, having received a response from the sync logic, then transmit the sync response to their NRU masters. In this way, all or a subset of CPUs in a system can perform an efficient barrier synchronization without contending for shared memory.

One advantage in the crossbar switch protocol described herein is that is an intelligent in-band bidirectional switch. This allows the maximum degree of connectivity with the minimum amount of control overhead. This allows more

TABLE 1

| Cycle | Master NRU | Switch Master | Switch Slave | Remote Slave | Remote NRU | Remote SRAM | Comments |
|---|---|---|---|---|---|---|---|
| 1. | !<slw> | | | ! | | | |
| 2. | !<port> | <slw> | | ! | | | Internal switch |
| 3. | !(addrs) | <port> | | ! | | | Connection delay |
| 4. | !<length>* | {addrs} | | ! | | | of 5 |
| 5. | !{data}* | <length>* | | ! | | | cycles shown for |
| 6. | !{cksum} | {data}* | | ! | | example due to | |
| 7. | | !{cksum} | | ! | | | switch |
| 8. | | ! | <slw> | ! | | | destination port |
| 9. | | ! | <port> | !<slw> | | | busy |
| 10. | | ! | {addrs} | !<port> | <slw> | | |
| 11. | | ! | <length>* | !{addrs} | <port> | | |
| 12. | | ! | {data}* | !<length>* | {addrs} | | |
| 13. | | ! | {cksum} | !{data}* | <length>* | | Delay of 1-2 |
| 14. | | ! | | !{cksum} | {data}* | | cycles to get to |
| 15. | | ! | | | !{cksum} | {addrs} | SRAM |
| 16. | | ! | | | !<ready> | {data} | Ready tag |
| 17. | | ! | | <ready> | !{data} | | generated by |
| 18. | | ! | <ready> | {data} | !<end> | | remote NRU to |
| 19. | | !<ready> | {data} | <end> | !{cksum} | | signal data |
| 20. | <ready> | !{data} | <end> | !{cksum} | | | following next |
| 21. | {data} | !<end> | {cksum} | ! | | | cycle |
| 22. | <end> | !{cksum} | | ! | | | |
| 23. | !{cksum} | | | ! | | | |

Minimum time is approximately 22 − 5 − 1 = 16 cycles.

CPUs to be interconnected since more switch ports can be supported, because there is no explicit switch control wires required. Another advantage is that it achieves a very low latency due to the bypass feature of the master/slave port transmission and the straight forward master/slave interconnect logic. This low latency with high band width means a high degree of parallel efficiency and performance is attained, even on somewhat serial programs. Additionally, the on-chip synchronization and broadcast features further permit efficient parallel computer system construction by minimizing overhead for these operations.

An additional feature of the present invention is that the crossbar switch can be cascaded by adding fields for the port ID to allow larger systems to be constructed. For example, in Table 1, line 2, denoting a remote load, there is only one port field. The switch also supports another protocol where there are multiple port fields. Then, each master port uses the first port field to establish a connection to the switch port, and marks the port field as processed. The slave port transmits the request to another crossbar switch, which is received by a master switch port, which then looks at the next port field to establish the connection to its slave port. In this way, systems can be constructed using hierarchical crossbars.

While the invention has been particularly shown and described with reference to a preferred embodiment, it will be understood by those skilled in the art that various changes in form and detail may be made therein without departing from the spirit and scope of the invention.

APPENDIX AI

| Cycle | Master NRU | Switch Master | Switch Slave | Remote Slave | Remote NRU | Remote SRAM | Comments |
|---|---|---|---|---|---|---|---|
| 1. | !<slmdw> | | | ! | | | |
| 2. | !<port> | <slmdw> | | ! | | | Internal switch |
| 3. | !(addrs) | <port> | | ! | | | Connection |
| 4. | !<length>* | {addrs} | | ! | | | delay of 5 cycles |
| 5. | !{data}* | <length>* | | ! | | | shown for |
| 6. | !{cksum} | {data}* | | ! | | example | |
| 7. | | !{cksum} | | ! | | | |
| 8. | | ! | <slmdw> | ! | | | |
| 9. | | ! | <port> | !<slmdw> | | | |
| 10. | | ! | {addrs} | !<port> | <slmdw> | | |
| 11. | | ! | <length>* | !{addrs} | <port> | | |
| 12. | | ! | {data}* | !<length>* | {addrs} | | |
| 13. | | ! | {cksum} | !{data}* | <length>* | | Delay of 1–2 |
| 14. | | ! | | !{cksum} | {data}* | | cycles to get to |
| 15. | | ! | | | !{cksum} | {addrs} | SRAM |
| 16. | | ! | | | !<ready> | {data} | Length of 4 |
| 17. | | ! | | <ready> | !{data} | {data} | shown with |
| 18. | | ! | <ready> | {data} | !{data} | {data} | SRAM speed = 1 |
| 19. | | !<ready> | {data} | {data} | !{data} | {data} | |
| 20. | <ready> | !{data} | {data} | {data} | !{data} | <end> | |
| 21. | {data} | !{data} | {data} | {data} | !<end> | {cksum} | |
| 22. | {data} | !{data} | {data} | <end> | !{cksum} | | |
| 23. | {data} | !{data} | <end> | !{cksum} | | | |
| 24. | {data} | !<end> | {cksum} | ! | | | |
| 25. | <end> | !{cksum} | | ! | | | |
| 26. | !{cksum} | | | ! | | | |

APPENDIX AII

| Cycle | Master NRU | Switch Master | Switch Slave | Remote Slave | Remote NRU | Remote SRAM | Comments |
|---|---|---|---|---|---|---|---|
| 1. | !<sstw> | | | ! | | | |
| 2. | !<port> | 'sstw> | | ! | | | Internal switch |
| 3. | !{addrs} | <port> | | ! | | | Connection |
| 4. | !<length>* | {addrs} | | ! | | | delay of 5 cycles |
| 5. | !{data} | >length}* | | ! | | | shown for |
| 6. | !{cksum} | {data} | | ! | | | example |
| 7. | | !{cksum} | | ! | | | |
| 8. | | ! | <sstw> | ! | | | |
| 9. | | ! | <port> | !<sstw> | | | |
| 10. | | ! | {addrs} | !<port> | <sstw> | | |
| 11. | | ! | <length>* | !{addrs} | <port> | | |
| 12. | | ! | {data} | !<length>* | {addres} | | |
| 13. | | ! | {cksum} | !{data} | <length>* | | Delay of 2–3 |
| 14. | | ! | | !{cksum} | {data} | | cycles to get to |
| 15. | | ! | | | !{cksum} | | SRAM |
| 16. | | ! | | | ! | >store} | |
| 17. | | ! | | | !<ready> | | |
| 18. | | ! | | <ready> | !{data}* | | |

APPENDIX AII-continued

| Cycle | Master NRU | Switch Master | Switch Slave | Remote Slave | Remote NRU | Remote SRAM | Comments |
|---|---|---|---|---|---|---|---|
| 19. | | ! | <ready> | {data}* | !{cksum} | | |
| 20. | | !<ready> | {data}* | !{cksum} | | | |
| 21. | <ready> | !{data}* | {cksum} | ! | | | |
| 22. | {data}* | !{cksum} | | ! | | | |
| 23. | !{cksum} | | | ! | | | |

APPENDIX AIII

| Cycle | Master NRU | Switch Master | Switch Slave | Remote Slave | Remote NRU | Remote SRAM | Comments |
|---|---|---|---|---|---|---|---|
| 1. | !<sstdw> | | | ! | | | |
| 2. | !<port> | '<sstdw> | | ! | | | Internal switch |
| 3. | !{addrs} | <port> | | ! | | | connection delay |
| 4. | !<length>* | {addrs} | | ! | | | of 5 cycles |
| 5. | !{data1} | >length}* | | ! | | | shown for |
| 6. | !{cksum} | {data1} | | ! | | | example; SRAM |
| 7. | | !{cksum} | | ! | | | speed = 1 |
| 8. | | ! | <sstdw> | ! | | | |
| 9. | | ! | <port> | !<sstdw> | | | |
| 10. | | ! | {addrs} | !<port> | <sstdw> | | |
| 11. | | ! | <length>* | !{addrs} | <port> | | |
| 12. | | ! | {data1} | !<length>* | {addrs} | | |
| 13. | | ! | {cksum} | !{data1} | <length>* | | Delay of 2–3 |
| 14. | | ! | | !{cksum} | {data1} | | cycles to get to |
| 15. | | ! | | | !{cksum} | | SRAM |
| 16. | | ! | | | ! | >store} | |
| 17. | | ! | | | !<ready> | | |
| 18. | | ! | | <ready> | !{data}* | | |
| 19. | | ! | <ready> | {data}* | !{cksum} | | |
| 20. | | !<ready> | {data}* | !{cksum} | | | |
| 21. | <ready> | !{data}* | {cksum} | ! | | | |
| 22. | {data}* | !{cksum} | | ! | | | |
| 23. | !{cksum} | | | ! | | | |
| 24. | !<ready> | | | ! | | | |
| 25. | !{data2} | <ready> | | ! | | | |
| 26. | !{data3} | {data2} | <ready> | ! | | | Need to wait to |
| 27. | !{data4} | {data3} | {data2} | !<ready> | | | establish path |
| 28. | {cksum} | !{data4} | {data3} | !{data2} | <ready> | | since there |
| 29 | | !{cksum} | {data4} | !{data3} | {data2} | | will not be |
| 30. | | ! | {cksum} | !{data4} | {data3} | <data2> | enough buffering |
| 31. | | ! | | !{cksum} | <data4> | <data3> | to switch |
| 32. | | ! | | | !{cksum} | <data4> | |
| 33. | | ! | | | <ready> | | |
| 34. | | ! | | <ready> | !{data}* | | |
| 35. | | ! | <ready> | {data}* | !{cksum} | | |
| 36. | | !<ready> | {data}* | !{cksum} | | | |
| 37. | <ready> | !{data}* | {cksum} | ! | | | |
| 38. | {data}* | !{cksum} | | ! | | | |
| 39. | !{cksum} | | | ! | | | |

APPENDIX AIV

| Cycle | Master NRU | Switch Master | Switch Slave | Remote Slave | Remote NRU | Remote SRAM | Comments |
|---|---|---|---|---|---|---|---|
| 1. | !<sbdw> | | | ! | | | |
| 2. | !<port> | <sbdw> | | ! | | | Internal switch |
| 3. | !{addrs} | <port> | | ! | | | Connection |
| 4. | !<length>* | {addrs} | | ! | | | shown for |
| 5. | ! | {data} | <length>* | ! | | | |
| 6. | !{cksum} | {data} | {data} | ! | | example; | |
| 7. | | !{cksum} | | ! | | | |
| 8. | | ! | <sbdw> | ! | | | Connect to |
| 9. | | ! | <port> | !<sbdw> | | | group #1 |
| 10. | | ! | {addrs} | !<port> | <sbdw> | | |
| 11. | | ! | <length>* | !{addrs} | <port> | | |

APPENDIX AIV-continued

| Cycle | Master NRU | Switch Master | Switch Slave | Remote Slave | Remote NRU | Remote SRAM | Comments |
|---|---|---|---|---|---|---|---|
| 12. | | ! | {data} | !<length>* | {addrs} | | |
| 13. | | ! | {cksum} | !{data} | <length> | | Delay of 2–3 |
| 14. | | ! | | !{cksum} | {data} | | cycles to get to |
| 15. | | ! | | | !{cksum} | | SRAM |
| 16. | | ! | | | ! | <store> | |
| 17. | | ! | | | !<ready> | | |
| 18. | | ! | | <ready> | !{data}* | | |
| 19. | | ! | <ready> | {data}* | !{cksum} | | ready signals |
| 20. | | ! | | !{cksum} | | | port group 1 |
| 21. | | ! | <start> | ! | | | comprise |
| 22. | | ! | <port> | !<start> | | | Connect to |
| 23. | | ! | {addrs} | !<port> | <start> | | group #2 |
| 24. | | ! | <length>* | !{addrs} | <port> | | |
| 25. | | ! | {data} | !<length>* | {addrs} | | |
| 26. | | ! | !{sksum} | !{data} | <length>* | | Delay of 2–3 |
| 27. | | ! | | !{cksum} | {data} | | cycles to get to |
| 28. | | ! | | | !{cksum} | | SRAM |
| 29. | | ! | | | ! | <store> | |
| 30. | | ! | | | !<ready> | | |
| 31. | | ! | | <ready> | !{data}* | | |
| 32. | | ! | <ready> | {data}* | !{cksum} | | ready signals port |
| 33. | | !<ready> | {data}* | !{cksum} | | | group 2 complete |
| 34. | <ready> | !{data}* | {cksum} | ! | | | Since all complete, |
| 35. | {data}* | !{cksum} | | ! | | | end token sent |
| 36. | !{cksum} | | | ! | | | to intitiating CE |

APPENDIX AV

| Cycle | Master NRU | Switch Master | Switch Slave | Remote Slave | Remote NRU | Remote SRAM | Comments |
|---|---|---|---|---|---|---|---|
| 1. | !<scas> | | | ! | | | |
| 2. | !<port> | <scas> | | ! | | | Internal switch |
| 3. | !{addrs} | <port> | | ! | | | Connectiondelay |
| 4. | !<length >* | {addrs} | | ! | | | of 5 cycles |
| 5. | !{data} | <length>* | | ! | | | shown for |
| 6. | !{cksum} | {data} | | ! | | | example |
| 7. | | !{cksum} | | ! | | | |
| 8. | | ! | <scas> | ! | | | |
| 9. | | ! | <port> | !<scas> | | | |
| 10. | | ! | {addrs} | !<port> | <scas> | | |
| 11. | | ! | <length>* | !{addrs} | <port> | | |
| 12. | | ! | {daa} | !<length>* | {addrs} | | |
| 13. | | ! | {cksum} | !{data} | <length>* | | Delay of 2–3 |
| 14. | | ! | | !{cksum} | {data} | | cycles to get to |
| 15. | | ! | | ! | !{cksum} | | SRAM |
| 16. | | ! | | | ! | <load> | *NRU blocks |
| 17. | | ! | | | !<compare> | | *other |
| 18. | | ! | | | <ready> | <store?> | *operations to |
| 19. | | ! | | <ready> | !{data} | | *this address |
| 20. | | ! | <ready> | {data} | !{cksum} | | *during the |
| 21. | | !<ready> | {data} | !{cksum} | | | *time; store |
| 22. | <ready> | !{data] | {cksum} | ! | | | *done if data |
| 23. | {data} | !{cksum} | | ! | | | *miscompares |
| 24. | !<cksum> | | | ! | | | |

APPENDIX AVI

| Cycle | Master NRU | Switch Master | Switch Slave | Remote Slave | Remote NRU | Remote SRAM | Comments |
|---|---|---|---|---|---|---|---|
| 1. | <ssync> | | | | | | |
| 2. | <port> | <ssync> | | | | | First group |
| 3. | {addrs}* | <port> | | | | | |
| 4. | <length>* | {addrs} | | | | | |
| 5. | {data}* | <length>* | | | | | |
| 6. | {cksum} | {data}* | | | | | |

APPENDIX AVI-continued

| Cycle | Master NRU | Switch Master | Switch Slave | Remote Slave | Remote NRU | Remote SRAM | Comments |
|---|---|---|---|---|---|---|---|
| 7. | | {cksum} | | | | | |
| 8. | | | <ssync} | | | | |
| 9. | | | <port> | <ssync> | | | Second group |
| 10. | <ssync} | | <length>* | <port> | <ssync} | | (second group |
| 11. | <port> | <start> | {data}* | {addrs}* | <port> | | transmission |
| 12. | {addrs}* | <port> | {cksum} | <length>* | {addrs}* | | through to |
| 13. | <length>* | {addrs}* | | {data}* | <length>* | | destination NRU |
| 14. | {data{* | <length>* | | {cksum} | {data}* | | not shown). |
| 15. | {cksum} | {data}* | | | {cksum} | | |
| 16. | | {cksum} | ***** | | | | At this time all |
| 17. | | | | | <ready> | | CE's have sunk, |
| 18. | | | | <ready> | {data}* | | ready broadcast |
| 19. | | | <ready> | {data}* | {cksum} | | over all switch |
| 20. | | <ready> | {data }* | {cksum} | | | ports to release |
| 21. | <ready> | {data}* | {cksum} | | | | |
| 22. | {data}* | {cksum} | | | | | |
| 23. | {cksum} | | | | | | |

APPENDIX AVII

| 6-bit binary code: | Mnemonic | Definition |
|---|---|---|
| xxxxxx | <idle> | idle tag |
| xxxxxx | <slw> | Load single W |
| xxxxxx | <sidw> | Load DW (including multiple) |
| xxxxxx | <sstw> | Store single W |
| xxxxxx | <sstdw> | Store DW (including multiple) |
| xxxxxx | <ssync> | Barrier sync |
| xxxxxx | <sbw> | Broadcast W |
| xxxxxx | <sbdw> | Broadcast DW |
| xxxxxx | <scas> | Compare & Swap |
| xxxxxx | <ready> | Ready tag (data next cycle) |
| xxxxxx | <end> | end tag - status ok - may nto be needed |
| xxxxxx | <enderr> | end tag - error - may not be needed |
| xxxxxx | | Hop token - port list of length k follows |
| xxxxxx | | Broadcast list follows |
| xxxxxx | | Barrier sync list follows |

We claim:

1. In a computer networking system having a crossbar switch connecting a plurality of ports, a method for connecting a first port to a second port selected from said plurality of ports, the method comprising the steps of:

requesting an ID from said second port by said first port;

transmitting said ID by said second port to said first port;

requesting a connection with said second port by said first port;

testing to determine if said connection has been granted by second port;

sending a command packet to said second port after granting connection;

determining if said command packet has been received by said second port; and upon determining said command packet has been received by said second port, waiting for a response including results of the execution of said command packet by said second port.

2. The method according to claim 1 further comprising the step of upon receipt of a connection request, transmitting a command packet by said second port to said first port.

3. In a computer networking system having a crossbar switch connecting a plurality of ports one to another, a protocol for establishing a connection between a first port and a second port selected from said plurality of ports, the protocol comprising:

providing a token broadcast by a first port;

performing system wake-up upon receipt of said token broadcast;

transmitting a port number and operation type to said second port;

decoding said operation type by said second port;

requesting a connection with said first port by said second port;

providing token transmission between said first port and said second port;

initializing said first port in response to said token transmission from said second port; and completing transaction of command packet information between said first port and said second port.

4. A computer networking system having a crossbar switch connecting a plurality of ports, said crossbar switch comprising:

means for transferring an ID request from a first port to a second port selected from a plurality of ports;

means for determining if connection has been granted by said second port;

means for sending a command packet to said second port after granting said connection; and means for determining if said command packet has been received by said second port, wherein upon determining said command packet has been received by said second port, the crossbar switch waits for a response that includes the results of the execution of said command packet by said second port.

5. The switch according to claim 1 further comprising means for transmitting a command packet by said second port to said first port upon receipt of a connection request.

6. A computer networking system having a crossbar switch connecting a plurality of ports one to another, said crossbar switch comprising:

means for providing a token broadcast by a first port;

means for performing system wake-up upon receipt of said token broadcast;

means for transmitting a port number and operation type to said second port;

means for decoding said operation type by said second port;

means for requesting a connection with said first port by said second port;

means for providing token transmission between said first port and said second port;

means for initializing said first port in response to said token transmission broadcasts from said second port; and means for completing transaction of command packet information between said first port and said second port.

* * * * *

UNITED STATES PATENT AND TRADEMARK OFFICE
CERTIFICATE OF CORRECTION

Page 1 of 9

PATENT NO. : 5,555,543
DATED : September 10, 1996
INVENTOR(S) : Grohoski et al.

It is certified that error appears in the above-indentified patent and that said Letters Patent is hereby corrected as shown below:

Column 5 and 6,

In the Table:

Please replace Table 1 with Table 1.

In the Appendixes:

Please replace Appendixes AI, AII, AIII, AIV, AV, AVI and AVII with the attached Appendixes AI, AII, AIII, AIV, AV, AVI and AVII.

Signed and Sealed this

Fourteenth Day of January, 1997

Attest:

BRUCE LEHMAN

Attesting Officer

Commissioner of Patents and Trademarks

| Cycle | Master NRU | Switch Master | Switch Slave | Remote Slave | Remote NRU | Remote SRAM | Comments |
|---|---|---|---|---|---|---|---|
| 1. | !<slw> | | | ! | | | |
| 2. | !<port> | <slw> | | ! | | | Internal switch Connection delay of 5 cycles shown for example due to switch destination port busy |
| 3. | !(addrs) | <port> | . | ! | | | |
| 4. | !<length>* | {addrs} | . | ! | | | |
| 5. | !{data}* | <length>* | . | ! | | | |
| 6. | !{cksum} | {data}* | . | ! | | | |
| 7. | | !{cksum} | . | ! | | | |
| 8. | | ! | <slw> | ! | | | |
| 9. | | ! | <port> | !<slw> | | | |
| 10. | | ! | {addrs} | !<port> | <slw> | | |
| 11. | | ! | <length>* | !{addrs} | <port> | | |
| 12. | | ! | {data}* | !<length>* | {addrs} | | |
| 13. | | ! | {cksum} | !{data}* | <length>* | . | Delay of 1-2 cycles to get to SRAM |
| 14. | | ! | | !{cksum} | {data}* | . | |
| 15. | | ! | | | !{cksum} | {addrs} | |
| 16. | | ! | | | !<ready> | {data} | Ready tag generated by remote NRU to signal data following next cycle |
| 17. | | ! | | <ready> | !{data} | | |
| 18. | | ! | <ready> | {data} | !<end> | | |
| 19. | | !<ready> | {data} | <end> | !{cksum} | | |
| 20. | <ready> | {data} | <end> | !{cksum} | | | |
| 21. | {data} | !<end> | {cksum} | ! | | | |
| 22. | <end> | !{cksum} | | ! | | | |
| 23. | !{cksum} | | | ! | | | |

Minimum time is approximately 22 - 5 - 1 = 16 cycles.

TABLE 1

Appendix AI

| Cycle | Master NRU | Switch Master | Switch Slave | Remote Slave | Remote NRU | Remote SRAM | Comments |
|---|---|---|---|---|---|---|---|
| 1. | !<simdw> | | | ! | | | |
| 2. | !<port> | <simdw> | | ! | | | Internal switch |
| 3. | !{addrs} | <port> | . | ! | | | Connection delay of 5 cycles |
| 4. | !<length> | {addrs} | . | ! | | | shown for |
| 5. | !{data}* | <length> | . | ! | | | example |
| 6. | !{cksum} | {data}* | . | ! | | | |
| 7. | | !{cksum} | . | ! | | | |
| 8. | | ! | <simdw> | ! | | | |
| 9. | | ! | <port> | !<simdw> | | | |
| 10. | | ! | {addrs} | !<port> | <simdw> | | |
| 11. | | ! | <length> | !{addrs} | <port> | | |
| 12. | | ! | {data}* | !<length> | {addrs} | | |
| 13. | | ! | {cksum} | !{data}* | <length> | . | Delay of 1-2 |
| 14. | | ! | | !{cksum} | {data}* | . | cycles to get to SRAM |
| 15. | | ! | | | !{cksum} | {addrs} | |
| 16. | | ! | | | !<ready> | {data} | Length of 4 |
| 17. | | ! | | <ready> | !{data} | {data} | shown with SRAM speed = |
| 18. | | ! | <ready> | {data} | !{data} | {data} | 1 |
| 19. | | !<ready> | {data} | {data} | !{data} | {data} | |
| 20. | <ready> | !{data} | {data} | {data} | !{data} | <end> | |
| 21. | {data} | !{data} | {data} | {data} | !<end> | {cksum} | |
| 22. | {data} | !{data} | {data} | <end> | !{cksum} | | |
| 23. | {data} | !{data} | <end> | !{cksum} | | | |
| 24. | {data} | !<end> | {cksum} | ! | | | |
| 25. | <end> | !{cksum} | | ! | | | |
| 26. | !{cksum} | | | ! | | | |

Appendix AII

| Cycle | Master NRU | Switch Master | Switch Slave | Remote Slave | Remote NRU | Remote SRAM | Comments |
|---|---|---|---|---|---|---|---|
| 1. | !<sstw> | | | ! | | | |
| 2. | !<port> | <sstw> | | ! | | | Internal switch |
| 3. | !{addrs} | <port> | . | ! | | | Connection |
| 4. | !<length>* | {addrs} | . | ! | | | delay of 5 cycles |
| 5. | !{data} | <length>* | . | ! | | | shown for |
| 6. | !{cksum} | {data} | . | ! | | | example |
| 7. | | !{cksum} | . | ! | | | |
| 8. | | ! | <sstw> | ! | | | |
| 9. | | ! | <port> | !<sstw> | | | |
| 10. | | ! | {addrs} | !<port> | <sstw> | | |
| 11. | | ! | <length>* | !{addrs} | <port> | | |
| 12. | | ! | {data} | !<length>* | {addrs} | | |
| 13. | | ! | {cksum} | !{data} | <length>* | . | Delay of 2-3 |
| 14. | | ! | | !{cksum} | {data} | . | cycles to get to |
| 15. | | ! | | | !{cksum} | . | SRAM |
| 16. | | ! | | | ! | <store> | |
| 17. | | ! | | | !<ready> | | |
| 18. | | ! | | <ready> | !{data}* | | |
| 19. | | ! | <ready> | {data}* | !{cksum} | | |
| 20. | | !<ready> | {data}* | !{cksum} | | | |
| 21. | <ready> | !{data}* | {cksum} | ! | | | |
| 22. | {data}* | !{cksum} | | ! | | | |
| 23. | !{cksum} | | | ! | | | |

Appendix AIII

| Cycle | Master NRU | Switch Master | Switch Slave | Remote Slave | Remote NRU | Remote SRAM | Comments |
|---|---|---|---|---|---|---|---|
| 1. | !<sstdw> | | | ! | | | |
| 2. | !<port> | <sstdw> | | ! | | | Internal switch connection delay of 5 cycles shown for example; SRAM speed = 1 |
| 3. | !{addrs} | <port> | . | ! | | | |
| 4. | !<length> | {addrs} | . | ! | | | |
| 5. | !{data1} | <length> | . | ! | | | |
| 6. | !{cksum} | {data1} | . | ! | | | |
| 7. | | !{cksum} | . | ! | | | |
| 8. | | ! | <sstdw> | ! | | | |
| 9. | | ! | <port> | !<sstdw> | | | |
| 10. | | ! | {addrs} | !<port> | <sstdw> | | |
| 11. | | ! | <length> | !{addrs} | <port> | | |
| 12. | | ! | {data1} | !<length> | {addrs} | | |
| 13. | | ! | {cksum} | !{data1} | <length> | . | Delay of 2-3 cycles to get to SRAM |
| 14. | | ! | | !{cksum} | {data1} | . | |
| 15. | | ! | | | !{cksum} | . | |
| 16. | | ! | | | ! | <store> | |
| 17. | | ! | | | !<ready> | | |
| 18. | | ! | | <ready> | !{data}* | | |
| 19. | | ! | <ready> | {data}* | !{cksum} | | |
| 20. | | !<ready> | {data}* | !{cksum} | | | |
| 21. | <ready> | !{data}* | {cksum} | ! | | | |
| 22. | {data}* | !{cksum} | | ! | | | |
| 23. | !{cksum} | | | ! | | | |
| 24. | !<ready> | | | ! | | | |
| 25. | !{data2} | <ready> | | ! | | | |
| 26. | !{data3} | {data2} | <ready> | ! | | | Need to wait to establish path since there will not be enough buffering to switch |
| 27. | !{data4} | {data3} | {data2} | !<ready> | | | |
| 28. | {cksum} | !{data4} | {data3} | !{data2} | <ready> | | |
| 29. | | !{cksum} | {data4} | !{data3} | {data2} | | |
| 30. | | ! | {cksum} | !{data4} | {data3} | <data2> | |
| 31. | | ! | | !{cksum} | <data4> | <data3> | |
| 32. | | ! | | | !{cksum} | <data4> | |
| 33. | | ! | | | <ready> | | |
| 34. | | ! | | <ready> | !{data}*- | | |
| 35. | | ! | <ready> | {data}* | !{cksum} | | |
| 36. | | !<ready> | {data}* | !{cksum} | | | |
| 37. | <ready> | !{data}* | {cksum} | ! | | | |
| 38. | {data}* | !{cksum} | | ! | | | |
| 39. | !{cksum} | | | ! | | | |

Appendix AIV

| Cycle | Master NRU | Switch Master | Switch Slave | Remote Slave | Remote NRU | Remote SRAM | Comments |
|---|---|---|---|---|---|---|---|
| 1. | !<sbdw> | | | ! | | | |
| 2. | !<port> | <sbdw> | | ! | | | Internal switch |
| 3. | !{addrs} | <port> | . | ! | | | Connection |
| 4. | !<length>* | {addrs} | . | ! | | | delay of 5 cycles |
| 5. | !{data} | <length>* | . | ! | | | shown for |
| 6. | !{cksum} | {data} | . | ! | | | example; |
| 7. | | !{cksum} | . | ! | | | |
| 8. | | ! | <sbdw> | ! | | | Connect to |
| 9. | | ! | <port> | !<sbdw> | | | group #1 |
| 10. | | ! | {addrs} | !<port> | <sbdw> | | |
| 11. | | ! | <length>* | !{addrs} | <port> | | |
| 12. | | ! | {data} | !<length>* | {addrs} | | |
| 13. | | ! | {cksum} | !{data} | <length> | . | Delay of 2-3 |
| 14. | | ! | | !{cksum} | {data} | . | cycles to get to |
| 15. | | ! | | | !{cksum} | . | SRAM |
| 16. | | ! | | | ! | <store> | |
| 17. | | ! | | | !<ready> | | |
| 18. | | ! | | <ready> | !{data}* | | |
| 19. | | ! | <ready> | {data}* | !{cksum) | | ready signals |
| 20. | | ! | | !{cksum} | | | port group 1 |
| 21. | | ! | <start> | ! | | | complete |
| 22. | | ! | <port> | !<start> | | | Connect to group #2 |
| 23. | | ! | {addrs} | !<port> | <start> | | |
| 24. | | ! | <length>* | !{addrs} | <port> | | |
| 25. | | ! | {data} | !<length>* | {addrs} | | |
| 26. | | ! | !{cksum} | !{data} | <length>* | . | Delay of 2-3 |
| 27. | | ! | | !{cksum} | {data} | . | cycles to get to |
| 28. | | ! | | | !{cksum} | . | SRAM |
| 29. | | ! | | | ! | <store> | |
| 30. | | ! | | | !<ready> | | |
| 31. | | ! | | <ready> | !{data}* | | |
| 32. | | ! | <ready> | {data}* | !{cksum} | | ready signals |
| 33. | | !<ready> | {data}* | !{cksum} | | | port group 2 complete |
| 34. | <ready> | !{data}* | {cksum} | ! | | | Since all |
| 35. | {data}* | !{cksum} | | ! | | | comlete, end token sent to |
| 36. | !{cksum} | | | ! | | | initiating CE |

Appendix AV

| Cycle | Master NRU | Switch Master | Switch Slave | Remote Slave | Remote NRU | Remote SRAM | Comments |
|---|---|---|---|---|---|---|---|
| 1. | !<scas> | | | ! | | | Internal switch Connection delay of 5 cycles shown for example |
| 2. | !<port> | <scas> | | ! | | | |
| 3. | !{addrs} | <port> | . | ! | | | |
| 4. | !<length>* | {addrs} | . | ! | | | |
| 5. | !{data} | <length>* | . | ! | | | |
| 6. | !{cksum} | {data} | . | ! | | | |
| 7. | | !{cksum} | . | ! | | | |
| 8. | | ! | <scas> | ! | | | |
| 9. | | ! | <port> | !<scas> | | | |
| 10. | | ! | {addrs} | !<port> | <scas> | | |
| 11. | | ! | <length>* | !{addrs} | <port> | | |
| 12. | | ! | {daa} | !<length>* | {addrs} | | |
| 13. | | ! | {cksum} | !{data} | <length>* | . | Delay of 2-3 cycles to get to SRAM |
| 14. | | ! | | !{cksum} | {data} | . | |
| 15. | | ! | | ! | !{cksum} | . | |
| 16. | | ! | | | ! | <load> | * NRU blocks *other *operations to *this address *during this *time; store *done if data *miscompares |
| 17. | | ! | | | !<compare> | | |
| 18. | | ! | | | <ready> | <store?> | |
| 19. | | ! | | <ready> | !{data} | | |
| 20. | | ! | | {data} | !{cksum} | | |
| 21. | | !<ready> | {data} | !{cksum} | | | |
| 22. | <ready> | !{data] | {cksum} | ! | | | |
| 23. | {data} | !{cksum} | | ! | | | |
| 24. | !<cksum> | | | ! | | | |

Appendix AVI

| Cycle | Master NRU | Switch Master | Switch Slave | Remote Slave | Remote NRU | Remote SRAM | Comments |
|---|---|---|---|---|---|---|---|
| 1. | <ssync> | | | | | | |
| 2. | <port> | <ssync> | | | | | First group |
| 3. | {addrs}* | <port> | . | | | | |
| 4. | <length>* | {addrs} | . | | | | |
| 5. | {data}* | <length>* | . | | | | |
| 6. | {cksum} | {data}* | . | | | | |
| 7. | | {cksum} | . | | | | |
| 8. | | | <ssync> | | | | |
| 9. | | | <port> | <ssync> | | | Second group (second group transmission through to destination NRU not shown). |
| 10. | <ssync> | | <length>* | <port> | <ssync> | | |
| 11. | <port> | <start> | {data}* | {addrs}* | <port> | | |
| 12. | {addrs}* | <port> | {cksum} | <length>* | {addrs}* | | |
| 13. | <length>* | {addrs}* | | {data}* | <length>* | | |
| 14. | {data{* | <length>* | | {cksum} | {data}* | | |
| 15. | {cksum} | {data}* | | | {cksum} | | |
| 16. | | {cksum} | ***** | | | | At this time all CE's have sunk, ready broadcast over all switch ports to release |
| 17. | | | | | <ready> | | |
| 18. | | | | <ready> | {data}* | | |
| 19. | | | <ready> | {data}* | {cksum} | | |
| 20. | | <ready> | {data}* | {cksum} | | | |
| 21. | <ready> | {data}* | {cksum} | | | | |
| 22. | {data}* | {cksum} | | | | | |
| 23. | {cksum} | | | | | | |

Appendix AVII

| 6-bit binary code: | Mnemonic | Definition |
|---|---|---|
| xxxxxx | <idle> | idle tag |
| xxxxxx | <slw> | Load single W |
| xxxxxx | <sldw> | Load DW (including multiple) |
| xxxxxx | <sstw> | Store single W |
| xxxxxx | <sstdw> | Store DW (including multiple) |
| xxxxxx | <ssync> | Barrier sync |
| xxxxxx | <sbw> | Broadcast W |
| xxxxxx | <sbdw> | Broadcast DW |
| xxxxxx | <scas> | Compare & Swap |
| xxxxxx | <ready> | Ready tag (data next cycle) |
| xxxxxx | <end> | end tag - status ok - may not be needed |
| xxxxxx | <enderr> | end tag - error - may not be needed |
| xxxxxx | | Hop token - port list of length k follows |
| xxxxxx | | Broadcast list follows |
| xxxxxx | | Barrier sync list follows |